June 10, 1952  P. G. CARPENTER  2,599,975
APPARATUS AND METHOD FOR MEASURING THE VELOCITY OF FLUIDS
Filed Nov. 8, 1948  2 SHEETS—SHEET 1

INVENTOR.
P. G. CARPENTER
BY Hudson & Young
ATTORNEYS

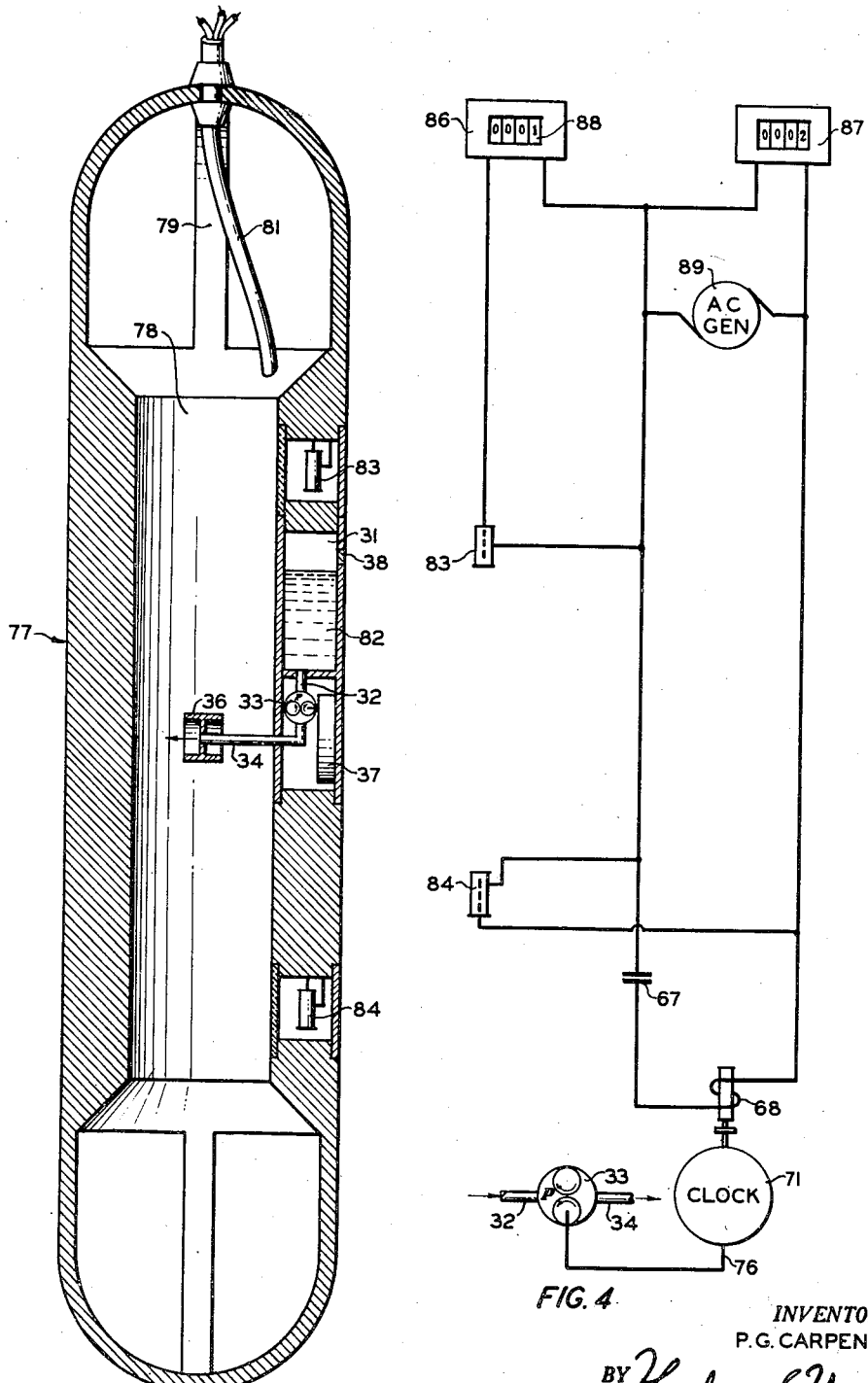

Patented June 10, 1952

2,599,975

UNITED STATES PATENT OFFICE 2,599,975

APPARATUS AND METHOD FOR MEASURING
THE VELOCITY OF FLUIDS

Paul G. Carpenter, Bartlesville, Okla., assignor
to Phillips Petroleum Company, a corporation
of Delaware Application November 8, 1948, Serial No. 58,884

8 Claims. (Cl. 250—83.6)

This invention relates to methods of and apparatus for measuring the velocity of fluids. In one specific aspect it relates to measuring the velocity of fluids in a well, but obviously it can be applied to measuring the velocity of fluids in pipes. In another specific aspect it relates to measuring the velocity of a first fluid by injecting a second fluid into the first fluid, and by determining the physical properties of the first fluid before and after said injection determining and indicating the velocity of the first fluid. In one specific aspect it relates to measuring the velocity of a first fluid by injecting a colored second fluid into the first fluid and measuring the difference in the ability of the first fluid to transmit light or other radiant energy. In another specific aspect it relates to injecting a radio active fluid and measuring the proportion of radio active fluid present.

In measuring the flow of fluids, especially in wells, great difficulty is experienced due to the fact that the fluid may change in composition unknown to the operator. The fluid in wells consists of gases and/or liquids coming from and/or contaminated by fluids coming from the geological formations. Such natural fluids from earth formations vary greatly in their ability to transmit light or other radiant energy, and they also vary greatly in their content of radio active material. Because of this fact it has been long considered impractical to measure the velocity by injecting a second fluid into the first fluid because the physical qualities of the first fluid vary so much without warning.

I have overcome the difficulties in such a measurement by providing constant comparison of the qualities of the first fluid before and after injection of the second fluid. While my method may consist of injecting a second gas, a vapor or vaporizable liquid into a first gas or vapor to measure the velocity of the same, I prefer to measure the velocity of a first liquid by injecting a second liquid in the same, and the illustrative embodiment of the invention shown in the drawings is so directed, it being understood however that the invention is applicable to gases and that a fluidized solid may be employed as the second fluid if desired.

One object of this invention is to provide an improved method and apparatus for measuring the rate and direction of flow of fluid.

Another object is to provide improved methods and means of measuring the flow of fluid in a well.

A further object is to provide suitable circuits for accurately measuring the flow of the fluids with remote control and remote indicating means suitable for insertion in a deep oil well or the like.

Numerous other objects and advantages will be apparent upon reading the accompanying specification, claims and drawings.

Figure 3 is an elevational cross sectional view of a device embodying a second modification of the present invention employing Geiger controls.

Figure 4 is an electrical circuit diagram showing the circuit employed in Figure 3.

Figure 1:
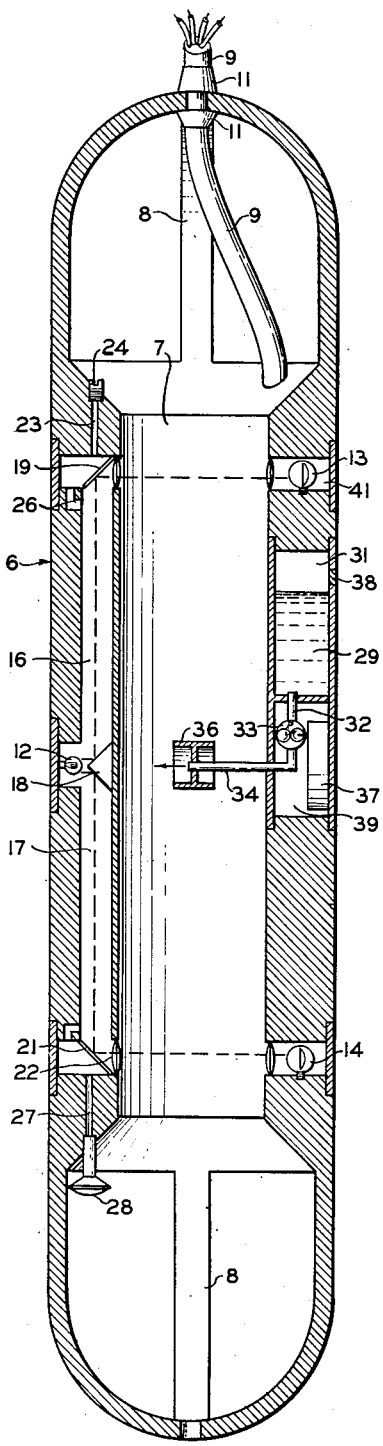
Figure 1 is an elevational cross sectional view of a device embodying the photocell modification of the present invention.

In Figure 1 a tubular body generally designated as 6 contains a tubular passage 7 through which fluid may flow from one end of body 6 to the other. Body 6 may be provided with a cage 8 at each end. Cage 8 acts to center the body, especially when the wall of the well or pipe (not shown) is irregular. Cage 8 also may be used to center a cable 9 which may be used for positioning body 6 and also for transmitting electrical energy in the circuit employed. Cable 9 may be secured to cage 8 by suitable securing means such as split clamping sleeve 11.

In the embodiment shown in Figure 1, I prefer to employ a single source 12 of radiant energy, although two similar uniform radiant energy sources (not shown) could be employed, because of the difficulty of having both sources equal in their output.

As the source of radiant energy 12 I prefer to employ an ordinary electric light bulb. In order to supply light from source 12 to photocells 13 and 14 I prefer to employ a pair of periscopes in tunnels 16 and 17. The periscopes comprise the respective reflecting surface of prism 18, mirrors 19 and 21. Tunnels 16 and 17 are preferably closed by windows 22 to avoid the accumulation of stagnant fluid in the tunnels. Windows 22 may be in the form of lenses serving to concentrate the radiant energy on its passage to the photocell but they need not be lenses and can just be flat windows. For operation in many wells windows 22 will be strong enough to keep fluid from entering space 16 and 17, but for operation under very high pressure in very deep wells space 16 and 17 can be filled with a transparent liquid (not shown) most liquids being substantially incompressible. Water would be suitable. This filling liquid can be added through conduit 23 closed by plug 24 and passing through equalizing passages 26 and 27, also fill an expansible bellows, or the like, 28. As the external pressure decreases and increases bellows 28 will allow for the small expansion of the filling liquid.

A source of supply of a second colored fluid 29 is provided in the form of a tank 31. This second fluid 29 is withdrawn from tank 31 through pipe 32 by pump 33 and discharged into space 7 through pipe 34. Suitable mixing of the two fluids may be aided by a turbulence increasing head 36.

Pump 33 is preferably a constant speed, constant rate of discharge pump and I have found that the usual rotary gear pump gives excellent results. The pump is driven by a motor 37 for which I prefer to employ a clock motor such as a spring wound motor with an escapement or governor (not shown) to control its speed, although various types of constant speed electric motors known to the prior art could be substituted in practicing the invention. The fluid 29 may be added to tank 31 by removing and replacing plug 38. The space 39 around clock 37 and the space 41 around photocell 13 may be filled with liquid as described for spaces 16 and 17 but it is preferred to have spaces 39 and 41 merely contain air under atmospheric pressure.

Figure 2:
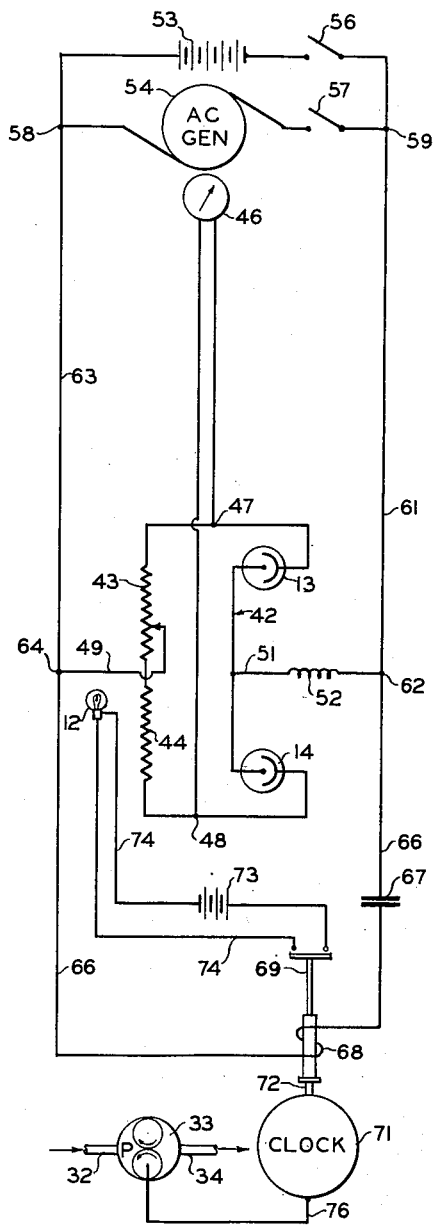
Figure 2 is an electrical circuit diagram showing the circuit employed in Figure 1.

In Figure 2 photocells 13 and 14 are shown in adjacent arms of a Wheatstone bridge generally designated as 42. The other two arms of bridge 42 contain resistances 43 and 44 respectively. A galvanometer 46 is connected in parallel with photocells 13 and 14 across points 47 and 48 of bridge 42. The opposite points of bridge 42 are connected to wires 49 and 51, one of which wires preferably contains an inductance 52 selected to prevent the passage of any substantial amount of alternating current.

A source of direct current 53 and a source of alternating current 54 are disposed to be connected in parallel when desired by switches 56 and 57 respectively at points 58 and 59. Point 59 is connected by wire 61 to point 62 and point 58 is connected by wire 63 to point 64. Points 62 and 64 are connected together by a parallel circuit one branch of which comprises wires 49 and 51 and Wheatstone bridge 42 while the other branch of the parallel circuit comprises wire 66 having a condenser 67 preferably disposed therein. Condenser 67 interrupts the flow of direct current through wire 66 but passes alternating current and the alternating current actuates solenoid 68.

Solenoid 68 when energized by alternating current from 54 closes switch 69 and starts clock 71 by arm 72. When the solenoid is de-energized the force of gravity (or a spring if desired (not shown)) reopens switch 69 and shuts off clock 71.

Light source 12 is energized by battery 73, or other suitable source of power through wire 74 when switch 69 is closed, and power source 73 can be conserved by opening switch 57 except when needed. Similarly the energy of clock 71 and the supply of the second fluid 29 is economized by opening switch 57.

Switch 56 conserves the energy of power source 53.

Clock 71 by a suitable shaft or other power transmission means 76 drives pump 33 as shown.

In Figure 3 a body generally designated as 77 has a passage 78 and end cages 79 similar to passage 7 and end cages 8 of Figure 1. A cable 81 similar to cable 9 is secured in a similar manner. The second fluid 82 however is different from second fluid 29 in that 82 contains radio active material which emits electrons or rays of a nature that will ionize a Geiger counter 83 or 84 and make the same conduct a pulse of electrical current.

Geiger counters 83 and 84 are broadly in the nature of radiant energy responsive detecting and measuring devices as are photocells 13 and 14, as the more light that falls or the photocell the more current that will pass through the photocell at a given potential whereas the oftener Geiger counters 83 and 84 are made conductive the more electricity that will pass through them in a given time.

As pump 33, clock 37 and parts 32, 34, and 36 are the same as in Figure 1 they have been given the same numbers.

In Figure 4 Geiger counters 83 and 84 are connected separately to Geiger counter amplifying and indicating circuits 86 and 87 respectively. As these circuits 86 and 87 are well known and many alternative forms may be employed they are not shown in detail. Circuits 86 and 87 may have various indicating means such as a movable hand (not shown) but it is preferred to have them indicate with a counter dial 88 such as employed in the usual odometer.

Also connected in the circuit shown in Figure 4 is a source of alternating current 89 which alternating current will pass through condenser 67 and actuate solenoid 68 in the same manner as set forth above relative to Figure 2 actuating clock 71 in the same manner to drive pump 33 through shaft 76.

*Operation*

The device shown in Figure 1 is lowered into the well or otherwise positioned in the path of the fluid flow the rate of flow of which it is desired to measure with a passage 7 so disposed that one end is at a point of lower pressure than the other end. Generally passage 7 is substantially parallel and perhaps concentric to the axis of the flow of the first fluid. All of the first fluid need not pass through passage 7 as long as a respective portion passes through. The first fluid is not shown but passes in through the spaces through cage 8, past photocells 13 and 14 (depending on the direction of flow) past the injection point of second fluid 36 and then past the remaining photocells 13 or 14 and out through the other cage 8.

It is assumed the first fluid is not completely opaque but some of the radiant energy from sources 12 reaches both photocells 13 and 14. As the colored fluid 29 being pumped into the first fluid is entering at a constant rate, the faster the first fluid flows through passage 7 the less coloring matter will it contain and therefore the nearer the amount of radiant energy received by cells 13 and 14. Conversely, the slower the flow of the first fluid the more of the second fluid will be therein as it passes the second photocell which will cause great unbalance between the photocells.

As shown in Figure 2 when the operator desires to take a reading of the velocity he closes switches 56 and 57. Switch 56 allows direct current from the source 53 to actuate bridge 42 through inductance 52 and the balance of bridge 42, or the extent of unbalance, is indicated on galvanometer 46 which preferably is adjacent the operator. On the other hand direct current cannot pass through wire 66 because of condenser 67.

Alternating current from generator 54 cannot enter Wheatstone bridge 42 because of inductance 52 but easily passes condenser 67 to energize solenoid 68 turning on light 12 and starting clock 71. Clock 71 drives pump 33 at a constant rate injecting colored fluid 29 at a constant rate into the first fluid at point 36.

Upon opening switch 56 bridge 42 ceases to function and upon opening switch 57 gravity moves arms 69 and 72 downwardly turning out light 12 and stopping clock 71 thereby conserving the supply of second fluid 29.

The apparatus shown in Figures 3 and 4 operates in substantially the same manner except that second fluid 82 is radio active. Natural fluids in wells often are more or less radio active and therefore it is important to employ one Geiger counter 83 or 84 to register the radio activity of the first fluid alone and the Geiger counter 83 or 84 to register the radio activity of the first fluid after the second fluid has been added.

The slower the first fluid moves through passage 78 the more it will contain of second fluid 82 and therefore the more often it will actuate the second Geiger counter relative to the amount that the first fluid alone actuated the first Geiger counter. From a comparison of indicators 86 and 87 in a given period (measured for example with a stop watch (not shown)) it can be determined in which direction the first fluid is flowing through passage 78 and its rate of flow. Condenser 67 keeps direct current out of the solenoid 68.

The above described embodiments of my invention have been fully disclosed for illustrative purposes but the scope of my invention is not limited thereby being instead defined in the following claims.

Having described my invention, I claim:

1. Apparatus for measuring the velocity of longitudinal flow of a first fluid in a well, or pipe, comprising in combination a tubular body disposed and movable as a unit longitudinally therein, a pair of photocells at longitudinally spaced points on said body, a supply of a second fluid, said second fluid being one that will color said first fluid when mixed therewith, a constant rate pump disposed and adapted to draw said second fluid from said supply and to continuously discharge the same into said first fluid at a point intermediate said photocells, a motor connected to drive said pump at a constant speed, remote control means connected to start said motor, means connected to said body for energizing said photocells with radiant energy transmitted through said first fluid, and remote indicating means operated by the electrical characteristics of said photocells indicating the difference in energy received by them whereby said velocity of said first fluid is measured.

2. Apparatus for measuring the velocity of longitudinal flow of a first fluid in a well, or pipe, comprising in combination a body disposed and movable as a unit longitudinally therein, a pair of photocells at longitudinally spaced points on said body, a supply of a second fluid, said second fluid being one that will color said first fluid when mixed therewith, a constant rate pump disposed and adapted to draw said second fluid from said supply and to continuously discharge the same into said first fluid at a constant rate at a point intermediate said photocells, a motor connected to drive said pump, means connected to said body for energizing said photocells with radiant energy transmitted through said first fluid, and remote indicating means operated by the electrical characteristics of said photocells indicating the difference in energy received by them whereby said velocity of said first fluid is measured.

3. Apparatus for measuring the velocity of longitudinal flow of a first fluid in a well, or pipe, comprising in combination a body positionable and movable as a unit longitudinally therein, said body having a passage disposed to pass at least some of said first fluid in said flow, an electrical circuit, a pair of radiant energy detectors comprising Geiger counters connected in said circuit and disposed at longitudinally spaced points on said body in said passage, a supply of a second fluid, a constant rate pump disposed and adapted to draw said second fluid from said supply and continuously discharge the same into said first fluid at a constant rate at a point intermediate said detectors, said second fluid being selected from radio active material containing fluids so that its presence in the first fluid adjacent one of said detectors affects the operation of the same as a function of the amount of said second fluid present, and indicating means connected to said electrical circuit to indicate the difference in operation of said detectors.

4. Apparatus for measuring the velocity of longitudinal flow of a first fluid in a well, or pipe, comprising in combination a body positionable and movable as a unit longitudinally therein, an electrical circuit, a pair of radiant energy detectors in said circuit and disposed at longitudinally spaced points on said body, a supply of a second fluid, a constant rate pump disposed and adapted to draw said second fluid from said supply and continuously discharge the same into said first fluid at a constant rate at a point intermediate said detectors, said second fluid being selected so that its presence in the first fluid adjacent one of said detectors affects the operation of the same as a function of the amount of said second fluid present, and indicating means connected to said electrical circuit to indicate the difference in operation of said detectors.

5. Apparatus for measuring the velocity of longitudinal flow of a first fluid comprising in combination a pair of photocells positioned on a body movable as a unit in said first fluid at points spaced along said direction of flow, a uniform source of light spaced across said flow from said photocells, a supply of a second colored fluid, a constant rate pump disposed and connected to draw said second fluid from said supply and continuously discharge the same at a constant rate into said first fluid at a point intermediate said photocells, a motor for driving said pump, a solenoid operated switch for turning said motor on and off, said photocells being in adjacent arms of a Wheatstone bridge circuit, a galvanometer in parallel with said photocells across said Wheatstone bridge, a source of alternating current to operate said solenoid switch, a source of direct current to operate said galvanometer, said two current sources being connected in parallel in a circuit, said solenoid switch and said Wheatstone bridge also being connected in parallel in said circuit.

6. Apparatus for measuring the velocity of longitudinal flow of a first fluid comprising in combination a pair of photocells positioned on a body movable as a unit in said first fluid at points spaced along said direction of flow, a uniform source of light spaced across said flow from said photocells, a supply of a second colored fluid, a constant rate pump disposed and connected to draw said second fluid from said supply and continuously discharge the same at a constant rate into said first fluid at a point intermediate said photocells, said photocells being in adjacent arms of a Wheatstone bridge circuit, a galvanometer in parallel with said photocells across said Wheatstone bridge, and a source of direct current to operate said galvanometer.

7. The combination of claim 5 in which a condenser in the circuit adjacent the solenoid switch prevents passage of said direct current therethrough.

8. In the combination set forth in claim 4 a motor for driving said constant rate pump at a constant rate, and remote control means for starting said motor comprising a solenoid switch adjacent said motor and controlling operation of the same, a remote alternating current generator, the alternating current conducting means between said solenoid and said generator comprising a portion of said electrical circuit.

PAUL G. CARPENTER.

REFERENCES CITED

The following references are of record in the file of this patent:

UNITED STATES PATENTS

| Number | Name | Date |
|---|---|---|
| 1,200,653 | Sawyer | Oct. 10, 1916 |
| 1,919,858 | Pettingill | July 25, 1933 |
| 1,977,359 | Styer | Oct. 16, 1934 |
| 2,353,382 | Barrett | July 11, 1944 |
| 2,431,899 | Wolf et al. | Dec. 2, 1947 |
| 2,453,456 | Piety | Nov. 9, 1948 |